US010927774B2

(12) United States Patent
Cai et al.

(10) Patent No.: US 10,927,774 B2
(45) Date of Patent: Feb. 23, 2021

(54) CONTROL OF MULTIPLE ENGINES USING ONE OR MORE PARAMETERS ASSOCIATED WITH THE MULTIPLE ENGINES

(71) Applicant: Caterpillar Inc., Deerfield, IL (US)

(72) Inventors: Zhijun Cai, Dunlap, IL (US); Ronald Gayles, Peoria, IL (US); Yanchai Zhang, Dunlap, IL (US); Stephen Nofsinger, Washington, IL (US); Maurice Dust, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 219 days.

(21) Appl. No.: 16/121,145

(22) Filed: Sep. 4, 2018

(65) Prior Publication Data

US 2020/0072137 A1 Mar. 5, 2020

(51) Int. Cl.

| | |
|---|---|
| ***H02J 3/00*** | (2006.01) |
| ***H02J 1/10*** | (2006.01) |
| ***F02D 25/02*** | (2006.01) |
| ***F02D 41/26*** | (2006.01) |
| ***F02D 29/06*** | (2006.01) |

(52) U.S. Cl.

CPC ............ *F02D 25/02* (2013.01); *F02D 29/06* (2013.01); *F02D 41/26* (2013.01); *F02D 2200/101* (2013.01); *F02D 2200/1002* (2013.01)

(58) Field of Classification Search

CPC ........................................ F02D 25/00
USPC ........................................ 307/57
See application file for complete search history.

(56) References Cited

U.S. PATENT DOCUMENTS

| | | | | |
|---|---|---|---|---|
| 9,368,972 | B2 | 6/2016 | Frampton | |
| 9,431,642 | B2 | 8/2016 | Frampton et al. | |
| 9,778,632 | B2 | 10/2017 | Frampton et al. | |
| 2010/0094490 | A1 | 4/2010 | Alston | |
| 2014/0309797 | A1 | 10/2014 | Frampton | |
| 2016/0301295 | A1* | 10/2016 | Regier | H02J 3/381 |
| 2017/0331325 | A1 | 11/2017 | Ristau | |
| 2017/0353037 | A1 | 12/2017 | Reddy | |
| 2019/0148745 | A1* | 5/2019 | Aikawa | F24H 1/00 429/430 |

FOREIGN PATENT DOCUMENTS

| | | |
|---|---|---|
| KR | 20150124023 A | 11/2015 |
| WO | 2018003890 | 1/2018 |

* cited by examiner

*Primary Examiner* — Rexford N Barnie
*Assistant Examiner* — Dru Parries
(74) *Attorney, Agent, or Firm* — Harrity & Harrity LLP

(57) ABSTRACT

An engine controller to control a plurality of engines is disclosed. The engine controller may identify a plurality of engines configured to provide power to a load, wherein the plurality of engines have a first set of priorities associated with providing the power to the load; receive a plurality of parameters from a plurality of monitoring devices monitoring the plurality of engines; calculate a plurality of metrics corresponding to the plurality of engines based on the plurality of parameters; determine, based on the plurality of metrics, that a switching condition is satisfied to switch from the first set of priorities to a second set of priorities for the plurality of engines; determine the second set of priorities for the plurality of engines based on the plurality of metrics; and cause the plurality of engines to provide respective amounts of power to the load based on the second set of priorities.

20 Claims, 4 Drawing Sheets

CONTROL OF MULTIPLE ENGINES USING ONE OR MORE PARAMETERS ASSOCIATED WITH THE MULTIPLE ENGINES

TECHNICAL FIELD

The present disclosure relates generally to engine control and, more particularly, to control of multiple engines using one or more parameters associated with the multiple engines.

BACKGROUND

A plurality of engines may be used in various implementations to provide power to a load when a single engine is not sufficient to provide power to the load. For example, a plurality of generators may be configured to provide electrical power to a load that requires more power than a single generator can output. In some implementations, a prioritization scheme associated with the engines may be used to determine power output associated with the plurality of engines. However, the prioritization scheme may not be the most efficient across the plurality of engines and/or may not enable the most productive use of the plurality of engines.

One attempt to control power of a set of engines is disclosed in U.S. Pat. No. 9,778,632 that issued to Frampton et al. on Oct. 3, 2017 ("the '632 patent"). In particular, the '632 patent describes a process that includes identifying a system parameter that is related to operation of the power generation system and determining which ones of a plurality of generators to operate by optimizing an operating variable of the power generation system based on the system parameter.

While the process of the '632 patent may describe optimizing an operating variable of the power generation system, the '632 patent does not disclose using respective priorities of engines of the power generation system to provide corresponding amounts of power to a load and/or switching the priorities associated with the engines of the power generation system based on the one or more of the system parameters or operating variables.

The engine controller of the present disclosure solves one or more of the problems set forth above and/or other problems in the art.

SUMMARY

According to some implementations, a method may include identifying a plurality of engines configured to provide power to a load, wherein the plurality of engines have a first set of priorities associated with providing the power to the load; receiving a plurality of parameters from a plurality of monitoring devices monitoring the plurality of engines; calculating a plurality of metrics corresponding to the plurality of engines based on the plurality of parameters; determining, based on the plurality of metrics, that a switching condition is satisfied to switch from the first set of priorities to a second set of priorities for the plurality of engines; determining the second set of priorities for the plurality of engines based on the plurality of metrics; and causing the plurality of engines to provide respective amounts of power to the load based on the second set of priorities.

According to some implementations, a device may include one or more memories and one or more processors, communicatively coupled to the one or more memories, to:

identify a plurality of engines configured to provide power to a load, wherein the plurality of engines have a first set of priorities associated with providing the power to the load; obtain a plurality of parameters corresponding to the plurality of engines; determine a plurality of metrics corresponding to the plurality of engines based on the plurality of parameters; determine, based on the plurality of metrics, that a switching condition is satisfied to switch from the first set of priorities to a second set of priorities for the plurality of engines; determine the second set of priorities for the plurality of engines based on the plurality of metrics; and cause the plurality of engines to provide respective amounts of power to the load based on the second set of priorities.

According to some implementations, a system may include a plurality of engines; a plurality of monitoring devices configured to monitor the plurality of engines; a plurality of engine control modules corresponding to the plurality of engines; and a controller to: identify a first set of priorities associated with the plurality of engines providing power to a load; obtain a plurality of parameters from the plurality of monitoring devices; determine a plurality of metrics corresponding to the plurality of engines based on the plurality of parameters; determine, based on the plurality of metrics, that a switching condition is satisfied to switch from the first set of priorities to a second set of priorities associated with providing power to the load; determine the second set of priorities based on the plurality of metrics; and cause the plurality of engine control modules to control the plurality of engines to provide respective amounts of power to the load based on the second set of priorities.

DETAILED DESCRIPTION

This disclosure relates to an engine controller. The engine controller has universal applicability to any machine or machines utilizing such an engine controller. The term "machine" may refer to any machine that performs an operation associated with an industry such as, for example, mining, construction, farming, transportation, fracturing, or any other industry. As some examples, the machine may be a generator system, a vehicle (e.g., a land-based vehicle or marine vehicle), a fracture rig, and/or the like. Moreover, one or more implements and/or systems may be connected to the machine and/or controlled by the engine controller.

Figure 1:
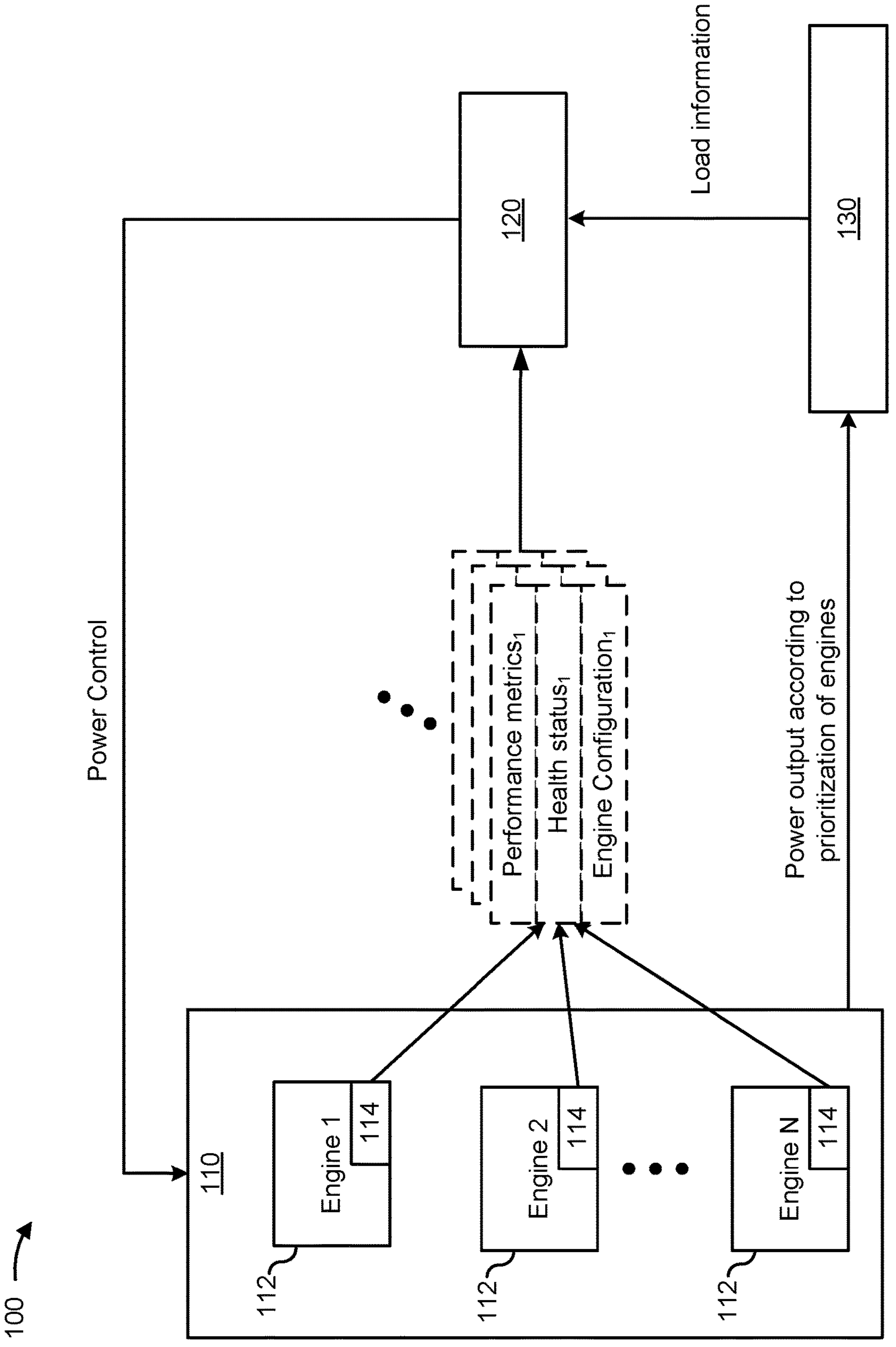
FIG. 1 is diagram of an example power system described herein.

FIG. 1 is a diagram of an example power system 100 described herein. Power system 100 of FIG. 1 includes power generation system 110 with a plurality of engines 112 (shown as engine 1 to engine N, where N is an integer and N>1) and corresponding engine control modules (ECMs) 114, an engine controller 120, and a load 130. The plurality of engines 112 may be referred to herein collectively as "engines 112" or individually as "engine 112." As shown and described herein, engine controller 120 may control engines 112 of power generation system 110 to provide mechanical and/or electrical power to load 130.

In some implementations, the plurality of engines 112 may be a plurality or set of generators (e.g., which may be referred to as a "generator set") configured to provide electrical power to a load. As described herein, one or more of engines 112 may include a compression ignition, internal combustion engine. Additionally, or alternatively, one or more of engines 112 may include any other type of internal combustion engine, such as, for example, a spark, laser, or plasma ignition engine. Engines 112 may be fueled by distillate diesel fuel, biodiesel, dimethyl ether, gaseous fuels, such as hydrogen, natural gas, propane, alcohol, ethanol, and/or any combination thereof.

In some implementations, each of the engines 112 may be a same type of engine. For example, all engines 112 may be made by a same manufacturer, be a same model, be configured to output a same amount of maximum power and/or torque, be configured to operate in a same manner, and/or the like. In some implementations, one or more of the engines 112 may be a different type relative to another engine 112. In such cases, a first engine may be a first type of engine configured to output a first amount of maximum power and a second engine may be a second type of engine configured to output a second amount of maximum power that is different from the first amount of maximum power. Furthermore, the engines 112 may be made by a different manufacturer and/or be a different model of engine.

ECMs 114 include one or more devices that provide corresponding control of engines 112 based on power control information from engine controller 120. In some implementations, ECM 114 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), and/or another type of processing component. The processor is implemented in hardware, firmware, or a combination of hardware and software. In some implementations, ECM 114 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by ECM 114. In some implementations, ECM 114 may include a memory (e.g., a non-transitory computer-readable medium) capable of storing instructions, that when executed, cause the processor to perform one or more processes and/or methods described herein.

ECM 114 may execute the instructions to perform various control functions and processes to control engines 112 according to instructions from engine controller 120. ECM 114 may include any appropriate type of engine control system configured to perform engine control functions such that engines 112 may operate properly. Further, ECM 114 may also control another system of a vehicle or machine, such as a transmission system, a hydraulics system, and/or the like.

Engine controller 120 includes one or more devices that provide power control information to control power output from power generation system 110. Engine controller 120 may use the power control information to cause ECMs 114 to control respective amounts of power that are provided from engines 112 to load 130. In some implementations, engine controller 120 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, engine controller 120 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by engine controller 120. In some implementations, engine controller 120 may include a memory (e.g., a non-transitory computer-readable medium) capable of storing instructions, that when executed, cause the processor to perform one or more processes and/or methods described herein.

Engine controller 120 may execute the instructions to perform various control functions and processes to cause ECMs 114 to control engines 112 based on load information and/or one or more parameters or one or more metrics of power generations system 110. Engine controller 120 may include any appropriate type of engine control system configured to perform optimization functions, prioritization functions, and/or power control functions.

In operation, engine controller 120 may execute computer software instructions to perform various control functions and processes to control power generation system 110, determine whether a prioritization scheme is to be adjusted, and/or to automatically adjust the prioritization scheme to control respective amounts of power output from engines 112, as described herein. As shown in the example of FIG. 1, engine controller 120 (e.g., via execution of the computer software instructions) provides power control information to power generation system 110 to provide power output to load 130 according to a prioritization of the engines 112. For example, the power control information may include instructions to ECMs 114 to increase and/or decrease power output from engines 112 according to a set of priorities (which may be referred to herein as a "prioritization scheme"). As a specific example, if the number N of the engines is 4, engine controller 120 may determine, from estimated health statuses of engines 1-4, a prioritization scheme indicating that engine 2 is to provide 40% of the power needed by load 130, engine 3 is to provide 30% of the load needed by load 130, and engines 1 and 4 are to each provide 15% of the power needed by load 130.

To determine the prioritization scheme, engine controller 120 may receive load information from load 130 and one or more parameters and/or one or more metrics from ECMs 114. The example load information may include an amount of power needed by load 130, an amount of power utilized by load 130 (e.g., over a recent period of time), a status of load 130 (e.g., whether undergoing a critical operation, whether experiencing a power shortage, whether experiencing a failure, and/or the like), and/or the like. As shown in FIG. 1, some of the one or more metrics may include performance metrics (e.g., fuel consumption rate, emission maps, engine speed, efficiency, power output, and/or the like), a real time on-board health status (e.g., a total usage, a life expectancy, component failure monitor, next required or scheduled maintenance, and/or the like), and/or an engine configuration (e.g., whether two or more of engines 112 are mechanically coupled to one another to operate together) of engines 112. In some implementations, a real time on-board health status may be input by one or more physics-based models running in ECMs 114. As described herein, engine controller 120 and/or ECMs 114 may calculate and/or determine the one or more metrics based on the one or more parameters measured by monitoring devices that are communicatively coupled with ECMs 114.

As described herein, engine controller 120 may iteratively determine whether to switch the prioritization scheme for controlling power output from engines 112. For example, as described herein, engine controller 120 may determine whether a switching condition is satisfied (e.g., one of engines 112 is providing too much power according to the power needed by load 130, one of engines 112 is providing more or less power than the engine 112 should be according to one or more metrics of associated with engines 112, and/or the like). Engine controller 120 may determine whether to switch the prioritization scheme periodically (e.g., every minute, every hour, every five hours, and/or the like) and/or aperiodically (e.g., based on an event, such as load 130 requesting an increase or decrease in power output, one of engines 112 experiencing a failure, one of engines 112 reaching a threshold usage, and/or the like).

Accordingly, as described herein, the engine controller 120 may adjust a prioritization scheme to control respective amounts of power that are output from engines 112, via communication with corresponding ECMs 114, according to the load information and the one or more parameters and/or the one or more metrics associated with engines 112.

As indicated above, FIG. 1 is provided as an example. Other examples are possible and may differ from what was described in connection with FIG. 1.

Figure 2:
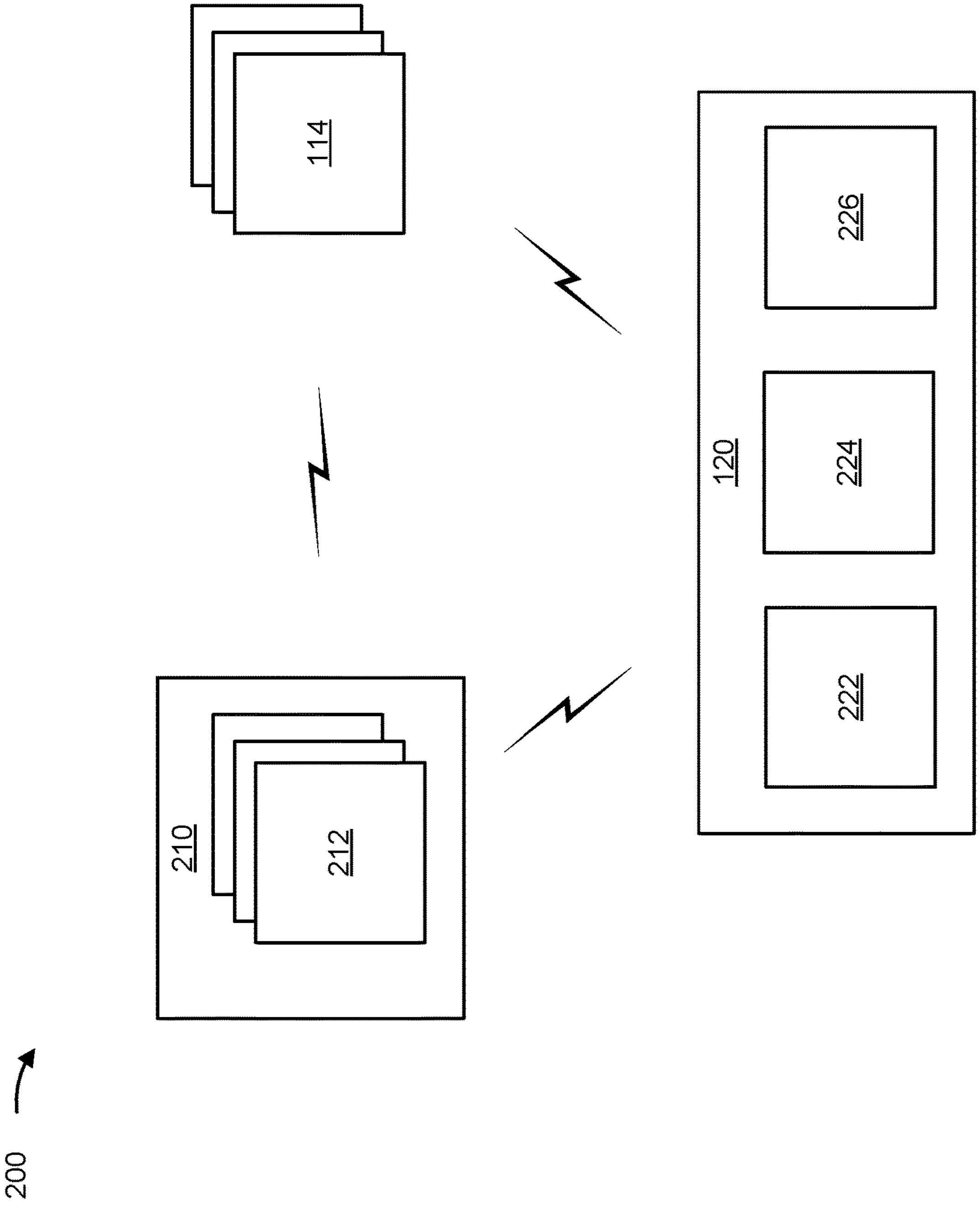
FIG. 2 is a diagram of an example engine control system that may be included within the power system of FIG. 1, as described herein.

FIG. 2 is a diagram of an example engine control system 200 that may be included within the power system 100 of FIG. 1, as described herein. As shown in FIG. 2, engine control system 200 includes ECMs 114, engine controller 120, and monitoring system 210. The components of engine control system 200 may be configured to communicate via wired communication and/or wireless communication.

Monitoring system 210 includes one or more monitoring devices 212 (which may be referred to herein individually as "monitoring device 212" or collectively as "monitoring devices 212"). Further, engine controller 120 includes an optimizer module 222, a priority module 224, and an engine output module 226.

Monitoring system 210 may provide measurements associated with various parameters used by engine controller 120 and/or ECMs 114 to control engines 112 and/or to determine a prioritization scheme associated with engines 112 providing power to load 130. Monitoring system 210 includes one or more monitoring devices 212. Monitoring devices 212 may include one or more cameras, one or more microphones, one or more Internet of Things (IoT) devices, one or more physical sensors (e.g., a vibration sensor, a speed sensor, a fuel sensor, a pressure sensor, a temperature sensor, an air sensor, and/or the like), and/or any appropriate type of monitoring device that generates values for parameters based on a computational model and/or one or more measured parameters. As used herein, parameters may refer to measurement parameters that are directly measured and/or estimated by one or more sensors (e.g., physical sensors, virtual sensors, and/or the like). Parameters may also include any output parameters that may be measured indirectly and/or calculated, based on readings of physical sensors, by monitoring devices 212, monitoring system 210, ECM 114, and/or engine controller 120. Measurements and/or information from monitoring devices 212, may refer to any values or information relevant to the one or more parameters and indicative of the state of engines 112. For example, measurements may include machine and environmental parameters, such as temperature values, pressure values, ambient conditions, fuel rates, engine speeds, vibrations and/or oscillations (which may be determined from vibration sensors, cameras, and/or microphones), usage time, usage rate, total power output, and/or the like.

Monitoring system 210 may be configured to coincide with ECMs 114 and/or engine controller 120, may be configured as a separate system, and/or may be configured as a part of other systems. Further, ECMs 114 and/or engine controller 120 may implement the monitoring system 210 by using computer software, hardware, or a combination of software and hardware. For example, ECMs 114 and/or engine controller 120 may execute instructions to cause monitoring devices 212 of monitoring system 210 to sense, measure, and/or generate values for one or more parameters based on a computational model and other parameters.

As described herein, the one or more parameters associated with monitoring devices 212 may be used to calculate and/or determine metrics (e.g., performance metrics, health status, and/or the like) of an engine 112. For example, to determine the health status (e.g., a life expectancy, whether maintenance is needed, whether a failure has occurred or is about to occur, and/or the like), a vibration sensor, camera, and/or microphone of a monitoring device 212 of engine 1 may determine that the engine 1 is experiencing an unusual amount of structural weakness (e.g., the vibration sensors sense vibrations, images from the camera detect unusual physical movement or repositioning of engine 112 within power generation system 110, the microphone captures audio indicating movement or a lack of structural integrity of the engine, and/or the like). Accordingly, based on the information from monitoring device 212, engine controller 120 (and/or an ECM 114) may determine that the engine needs maintenance or may need maintenance within an upcoming time period (which may depend on the severity of the vibration, movement, and/or noises detected).

Optimizer module 222 may include one or more devices configured to perform an optimization process to identify an optimized power output configuration for engines 112 according to one or more parameters and/or metrics associated with the parameters. As shown, optimizer module 222 may be included within and/or implemented by engine controller 120. Optimizer module 222 may be configured via a user interface and/or default setting to identify the plurality of engines 112 and determine an optimized power output based on values of one or more metrics determined from values of parameters received from monitoring devices 212. According to some implementations, optimizer module 222 may be configured to determine the optimized power output according to one or more metrics as indicated by user input received via the user interface and/or by default settings.

Optimizer module 222, according to some implementations, may be configured to identify engines 112 that may be configured to provide power to load 130. For example, optimizer module 222 may determine which of engines 112 are operational, are not operational, have provided a threshold amount of power, and/or the like. For example, optimizer module 222 may receive a plurality of parameters from monitoring devices 212 that correspond to operational characteristics of engines 112. Optimizer module 222 may calculate and/or determine (e.g., from a mapping) one or more metrics from the plurality of parameters. Such metrics may include performance metrics of one or more of engines 112, a health status of one or more of engines 112, and/or the like. Furthermore, optimizer module 222 may consider whether one or more of engines 112 are configured to operate together (e.g., as indicated by configurations or settings provided by ECMs 114). For example, two or more engines 112 may be mechanically configured to operate together (e.g., if one of the engines 112 is running at a particular engine speed, another one of the engines is running at that particular engine speed). In such a case, optimizer module 222 may determine that, if a first engine of those engines is to provide a particular amount of power, then other engine(s) may be configured to provide a corresponding amount of power (and/or incur corresponding costs (e.g., fuel, usage time, and/or the like)) at the operational settings of the first engine and/or may provide additional load on the first engine if the other engines are not configured to provide power.

According to some implementations, optimizer module 222 may implement a scoring system to determine an optimized power output configuration according to one or more metrics determined from the one or more parameters provided by monitoring devices 212. For example, optimizer module 222 may identify a metric that is to be optimized (e.g., according to user input and/or default settings of engine controller 120) and generate a ranking of engines 112 according to the metrics calculated or determined for engines 112 from parameters provided by monitoring devices 212. For example, for life expectancy, optimizer module 222 may obtain usage information for engines 112 (e.g., indicating how much power over a period of time was output from each of engines 112), total power output from each of engines 112, expected total power output for each of the engines, mechanical and/or information (e.g., based on vibration information, oil quality information (e.g., oil dielectric, oil viscosity, particulate in oil, and/or the like), and/or the like), and/or the like to estimate an amount of power that may be output until an engine 112 is expected to fail or need maintenance. Optimizer module 222 may use such a scoring system to weight the one or more parameters and calculate the estimated amount of remaining power for each of engines 112.

In some implementations, optimizer module 222 may use the one or more parameters from monitoring devices 212 to train a machine learning model to estimate the life expectancy of an engine 112. For example, usage information for engines 112 (e.g., indicating how much power over a period of time was output from each of engines 112), total power output from each of engines 112, expected total power output for each of engines 112, mechanical and/or structural information, wear of the engines as indicated by temperature (e.g., due to heat generation or friction), and/or the like may be used as inputs to train the machine learning model. Historical information associated with determining the life expectancy may also be used to train the model. Using the historical information and the one or more parameters from monitoring device 212, optimizer module 222 may train the machine learning model to estimate and/or predict the life expectancy (or remaining amount of kilowatt hours that may be output) of each engine 112. Accordingly, optimizer module may calculate the life expectancy for each of engines 112 and rank the engines according to the determine life expectancy. Other metrics (e.g., performance metrics (e.g., speed, maximum power output, and/or the like), fuel consumption, and/or the like) may be similarly considered.

Similarly, in some implementations, monitoring system 210 (and/or engine controller 120) may utilize one or more models to determine other metrics associated with engines 112 and/or the life expectancy of engines 112. For example, the monitoring system 210 may utilize a power capability model based on maximum power available as determined from an inlet air sensor (e.g., an amount of oxygen in the air, the density of the air, the humidity of the air, and/or the like), temperature sensor, pressure sensor, and/or the like. Additionally, or alternatively, a fuel efficiency model may be used to determine engine efficiency of engines 112 according to wear and/or power loss as determined by a fuel sensor (e.g., to calculate fuel consumption rate). A wear model may be used based on temperature, pressure, and/or quality of oil and/or lubrication of the engines 112 to determine heat generation and/or friction within engines 112 (which may indicate maintenance or life expectancy). A heat rejection model may be used to determine maximum power according to temperature, air flow, and/or pressure of coolant of engines 112.

Accordingly, optimizer module 222 may determine a prioritization scheme (or a set of priorities) that engine controller 120 may use to cause ECMs to control engines to output respective amounts of power according to the prioritization scheme.

Priority module 224, according to some implementations, is configured to control the prioritization scheme for controlling engines 112 of power generation system 110. For example, priority module 224 may compare the optimized power configuration determined by optimizer module 222 with a current power output configuration to determine whether a switching condition has been satisfied to switch the prioritization scheme (e.g., from a first set of priorities for engines 112 to a second set of priorities for engines 112).

In some implementations, priority module 224 may compare current metrics of the engines 112 with one another and determine that priorities are to be adjusted according to the metrics of engines 112. For example, priority module 224 may determine that a metric for one engine does not fall within a range of corresponding metrics for other engines and/or that the metric from the one engine is not within a threshold difference from the other metrics. As a more specific example, assuming four engines 1-4, priority module 224 may determine that engine 1 is expected to experience a failure within 30 days, while engines 2-4, on average, are expected to experience a failure within 180 days. In some implementations, the average of the life expectancy (or any metric) may correspond to a mean, median, or mode of metrics of the respective engines 112. If engine 1 is providing more than a threshold amount of power (e.g., greater than 25%) needed by load 130, priority module 224 may determine that a switching condition has been satisfied, and that the amount of power to be provided by engine 1 is to be reduced (e.g., to 10%). However, if engine 1 is already providing less than 25% of the power needed by load 130, priority module 224 may determine that the switching condition has not been satisfied. Additionally, or alternatively, if the life expectancy of all engines 1-4 is within a threshold range and/or difference from one another, and the engine output from each of engines 1-4 is within a threshold range of 25%, priority module 224 may determine that the switching condition has not been satisfied.

Similarly, priority module 224, when the fuel consumption rate is to be optimized, may determine that a value of a first fuel consumption rate (e.g., determined by a fuel sensor of monitoring device 212) of a first engine 112 (e.g., engine 1) is not within a range of respective values of other fuel consumption rates of respective fuel consumption rates of other engines (e.g., engines 2-4). In such a case, priority module 224 may determine that the switching condition associated with fuel consumption rate is satisfied based on one of the fuel consumption rates not being within a threshold range of other fuel consumption rates associated with engines 112.

In some implementations, the priority module 224 may determine whether or not the prioritization scheme should be switched according to one or more characteristics of the load and/or the power generation system 110, despite the fact that a switching condition associated with a metric is satisfied. For example, if the load is performing a critical operation, priority module 224 may determine that the prioritization scheme is not to be switched to optimize the metric to avoid any power loss and/or disruption to the critical operation. Additionally, or alternatively, the priority module 224 may determine that a prioritization scheme is not to be switched to optimize the metric if a previous switch was performed within a threshold time period. For example, if the set of priorities for engines 112 to provide respective amounts of power was switched within the last minute, hour, five hours, and/or the like, priority module 224 may determine that the set of priorities are not to be switched (e.g., to avoid changing power outputs from the engine too frequently, resulting in additional stress to engines 112 and/or inefficiencies in operating engines 112 that are associated with altering power output). Accordingly, although a switching condition associated with a metric is satisfied, priority module 224 may determine whether the timing is proper to switch prioritization schemes.

In some implementations, priority module 224, may determine when to switch the prioritization scheme. For example, priority module 224 may monitor timing associated with a critical operation of load 130 (e.g., to determine when the critical operation has ended) and/or determine when a threshold time period associated with a previous switching of the prioritization scheme passes.

In some implementations, priority module 224 may determine that a time to switch prioritization schemes may be when at least two engines 112 are providing a same amount of power and/or when differences between respective amounts of power provided by the two engines are within a same range. Accordingly, the priority module 224 may determine that the prioritization scheme is to be adjusted in order to differentiate (or further differentiate) the respective amounts of power provided by the engines 112. In some implementations, priority module 224 may generate new prioritization schemes according to the optimized power configuration, using one or random settings, and/or according to preconfigured priorities (e.g., provided by a user, manufacturer, and/or default settings).

Therefore, as described herein, priority module 224 may designate whether or not a prioritization scheme to control power output from engines 112 is to be switched or remain the same. As such, priority module 224 may indicate to engine output module 226 whether a new prioritization scheme or a current prioritization scheme is to be used to control power output from engines 112.

Engine output module 226 causes engines 112 to provide respective amounts of power to load 130 based on the prioritization scheme designated by priority module 224. For example, engine output module 226 may provide instructions to ECMs 114 to cause the ECMs to increase or decrease respective amounts of power provided by engines 112 to load 130. As such, the ECMs 114 may accordingly increase and/or decrease the respective amounts of power produced (e.g., by increasing or decreasing an amount of fuel injected into cylinders of engines 112) by engines 112.

As indicated above, FIG. 2 is provided as an example. Other examples are possible and may differ from what was described in connection with FIG. 2.

Figure 3:
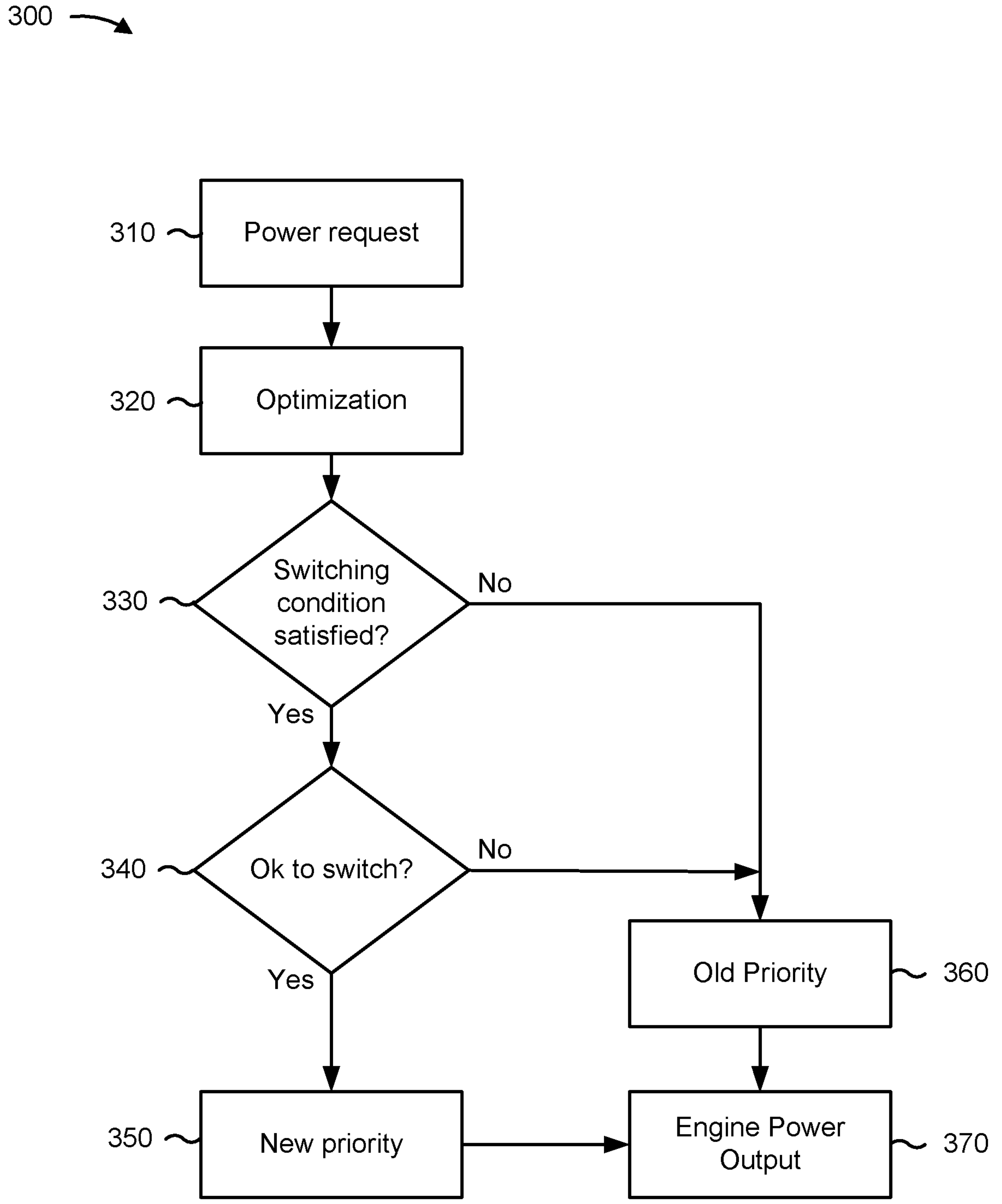
FIG. 3 is a diagram of example control logic that may be implemented by an engine controller, as described herein.

FIG. 3 is a diagram of example control logic that may be implemented by an engine controller, as described herein. In some implementations, one or more process blocks of FIG. 3 may be performed by engine controller 120. In some implementations, one or more process blocks of FIG. 3 may be performed by another device or a group of devices separate from or including the engine controller, such as monitoring system 210 or more ECM(s) 114.

As shown in FIG. 3 and by block 310, a power request is received and/or obtained. For example, load 130 may provide a power request to engine controller 120. In some implementations, the power request may indicate one or more of an amount of power required, a type of power required, a length of time associated with providing the power, a degree of importance of the power (or of tasks or processes that may be using the power), a status of the load, and/or the like.

As further shown in FIG. 3 and by block 320, an optimized power output configuration may be determined according to the power request and parameters provided by monitoring system 210 and/or metrics associated with engines 112 determined from the parameters, as described herein.

As further shown in FIG. 3 and by block 330, engine controller 120 may determine whether a switching condition is satisfied. In some implementations, engine controller 120 may determine whether a current power output configuration from engines 112 is optimized according to the optimization, as described herein. If engine controller 120 determines that the switching condition is not satisfied, control advances to block 360. If engine controller 120 determines the switching condition is satisfied, engine controller 120, as shown in FIG. 3 and by block 340, determines whether the engine controller 120 is okay to switch priorities from an old priority to a new priority (e.g., based on one or more characteristics of power generation system 110, engine controller 120, and/or load 130, and/or the like). If engine controller 120 determines that engine controller 120 is not ok to switch, control advances to block 360. If engine controller 120 determines engine controller 120 is ok to switch, engine controller 120, as shown in FIG. 3 and by block 350, provides the new priority. The new priority may be generated for engines 112 according to the optimization and control advances to block 370.

As further shown in FIG. 3 and by block 360, if engine controller 120 determines that the switching condition is not satisfied and/or that engine controller 120 is not to switch the priorities, engine controller 120 may determine that engines 112 are to operate according to the old (or existing) priority. As further shown in FIG. 3 and by block 370, engine controller 120 provides engine power output according to the old priority or new priority as determined from block 330 and/or block 340.

In some implementations, after block 370 of FIG. 3, control may return to block 310 and/or block 320. Accordingly, the control logic 300 of FIG. 3 may be executed periodically (e.g., every minute of operation, ten minutes of operation, every hour of operation, and/or the like) and/or aperiodically (e.g., based on an event, such as receiving a new power request from the load, detecting a failure in an engine 112 of power generation system 110, determining a change in operation conditions of power generation system 110, and/or the like).

As indicated above, FIG. 3 is provided as an example. Other examples are possible and may differ from what was described in connection with FIG. 3.

Figure 4:
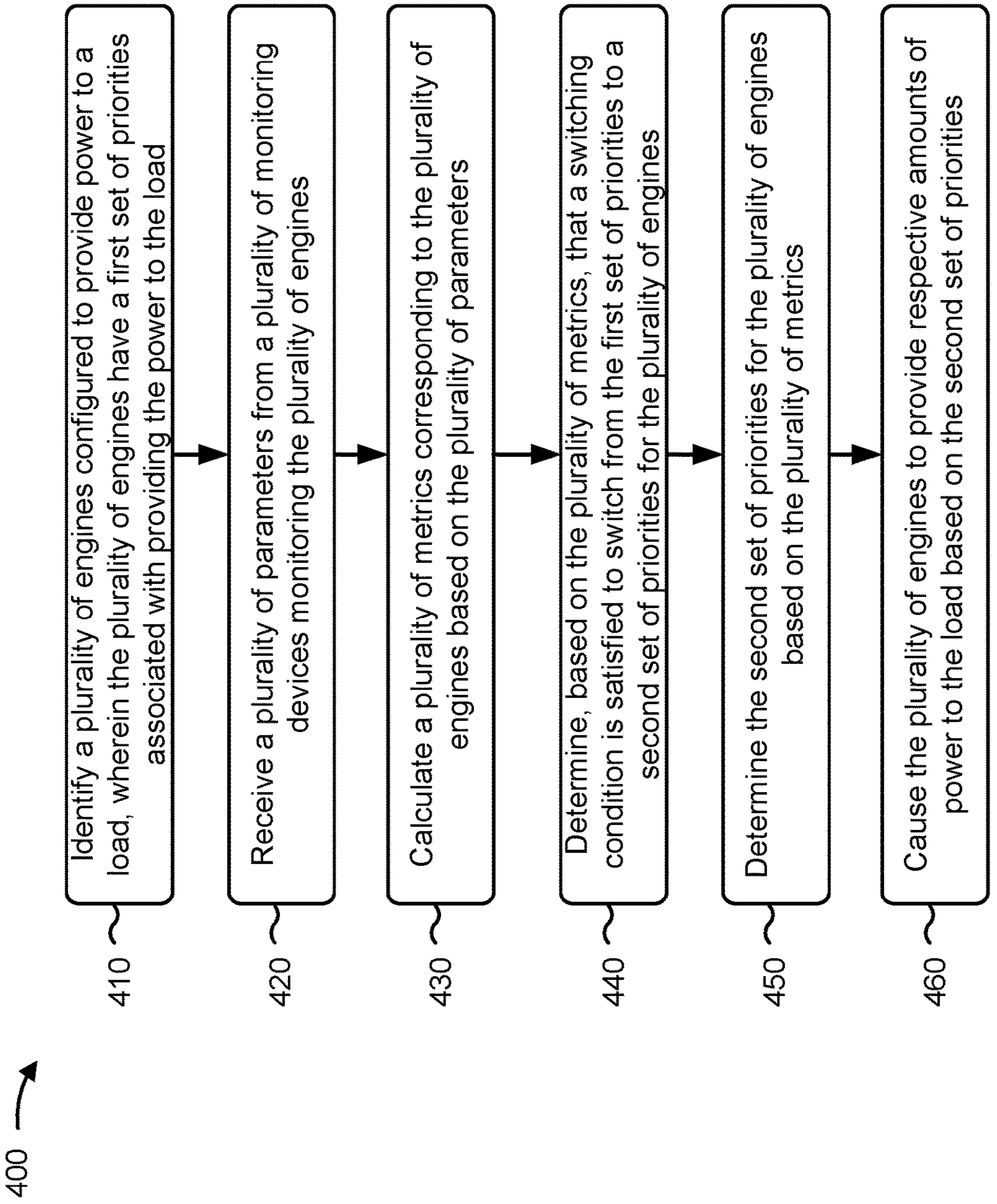
FIG. 4 is a flowchart of an example process for controlling multiple engines using one or more parameters associated with the multiple engines.

FIG. 4 is a flowchart of an example process 400 for controlling multiple engines using one or more parameters associated with the multiple engines. In some implementations, one or more process blocks of FIG. 4 may be performed by an engine controller (e.g., engine controller 120). In some implementations, one or more process blocks of FIG. 4 may be performed by another device or a group of devices separate from or including the engine controller, such as a monitoring system (e.g., monitoring system 210) or one or more engine control modules (e.g., ECM(s) 114).

As shown in FIG. 4, process 400 may include identifying a plurality of engines configured to provide power to a load, wherein the plurality of engines have a first set of priorities associated with providing the power to the load (block 410). For example, the engine controller (e.g., using optimizer module 222, priority module 224, and/or the like) may identify a plurality of engines configured to provide power to a load, as described above. In some implementations, the plurality of engines have a first set of priorities associated with providing the power to the load. In some implementations, the engine controller may identify the first set of priorities associated with the plurality of engines providing power to a load.

As further shown in FIG. 4, process 400 may include receiving a plurality of parameters from a plurality of monitoring devices monitoring the plurality of engines (block 420). For example, the engine controller (e.g., using optimizer module 222, priority module 224, and/or the like) may receive a plurality of parameters from a plurality of monitoring devices monitoring the plurality of engines, as described above. In some implementations, the engine controller may obtain the plurality of parameter from the plurality of monitoring devices.

As further shown in FIG. 4, process 400 may include calculating a plurality of metrics corresponding to the plurality of engines based on the plurality of parameters (block 430). For example, the engine controller (e.g., using optimizer module 222, priority module 224, and/or the like) may calculate a plurality of metrics corresponding to the plurality of engines based on the plurality of parameters, as described above. In some implementations, the engine controller may determine the plurality of metrics corresponding to the plurality of engines based on the plurality of parameters.

As further shown in FIG. 4, process 400 may include determining, based on the plurality of metrics, that a switching condition is satisfied to switch from the first set of priorities to a second set of priorities for the plurality of engines (block 440). For example, the engine controller (e.g., using optimizer module 222, priority module 224, and/or the like) may determine, based on the plurality of metrics, that a switching condition is satisfied to switch from the first set of priorities to a second set of priorities for the plurality of engines, as described above. For example, the second set of priorities may be associated with providing power to the load.

As further shown in FIG. 4, process 400 may include determining the second set of priorities for the plurality of engines based on the plurality of metrics (block 450). For example, the engine controller (e.g., using optimizer module 222, priority module 224, and/or the like) may determine the second set of priorities for the plurality of engines based on the plurality of metrics, as described above.

As further shown in FIG. 4, process 400 may include causing the plurality of engines to provide respective amounts of power to the load based on the second set of priorities (block 460). For example, the engine controller (e.g., using optimizer module 222, priority module 224, engine output module 226, and/or the like) may cause the plurality of engines to provide respective amounts of power to the load based on the second set of priorities, as described above.

Process 400 may include additional implementations, such as any single implementation or any combination of implementations described below and/or in connection with one or more other processes described elsewhere herein.

In some implementations, the engine controller, when determining the second set of priorities for the plurality of engines, may generate a ranking of the plurality of engines according to the plurality of metrics, determine a total amount of power that is to be provided to the load, configure the second set of priorities according to the ranking and the total amount of power to be provided to the load.

In some implementations, the engine controller, when determining that the switching condition is satisfied, may determine that a value of a metric, of the plurality of metrics, is not within a range of respective values of remaining metrics of the plurality of metrics and determine that the switching condition is satisfied based on the value of the metric not being within the range of respective values of the remaining metrics.

In some implementations, two engines, of the plurality of engines, are mechanically coupled, such that the two engines are to be controlled to have a same engine speed. In some implementations, the engine controller, when determining the second set of priorities for the plurality of engines, may determine the second set of priorities for the plurality of engines further based on the two engines being mechanically coupled.

In some implementations, a monitoring device, of the plurality of monitoring devices, includes one or more of: a vibration sensor; an oil quality sensor; a speed sensor; a fuel sensor; a power output sensor; a pressure sensor; an air sensor; a coolant sensor, or a temperature sensor. In some implementations, the plurality of metrics may include respective amounts of remaining kilowatt hours that respective ones of the plurality of engines are expected to provide until the respective ones of the plurality of engines are expected to experience a failure or need maintenance. In some implementations, the plurality of engines comprise a plurality of generators and the power provided to the load comprises electrical power.

In some implementations, the plurality of metrics include respective amounts of remaining kilowatt hours that respective engines of the plurality of engines are expected to provide until the respective engines of the plurality of engines are expected to experience a failure or need maintenance.

In some implementations, the engine controller, when determining that the switching condition is satisfied, may determine that a value of a metric, of the plurality of metrics, is not within a threshold difference of an average value of remaining metrics of the plurality of metrics, and determine that the switching condition is satisfied based on the value of the metric not being within the threshold difference of the average value of the remaining metrics. In some implementations, determine that an operation associated with the load can be performed in association with the switch from the first set of priorities to the second set of priorities based on the plurality of parameters and a characteristic of the load.

In some implementations, the plurality of parameters corresponding to the plurality of engines are received from corresponding monitoring devices associated with the plurality of engines. In some implementations, the plurality of engines are all a same type of engine.

In some implementations, the plurality of metrics comprise respective remaining amounts of kilowatt hours that are estimated to be provided by the plurality of engines. In some implementations, the engine controller, when determining that the switching condition is satisfied, may determine that a value of an amount of remaining kilowatt hours, of the respective remaining amounts of kilowatt hours, is not within a range of respective values of other remaining amounts of kilowatt hours of the respective remaining amounts of kilowatt hours, and determine that the switching condition is satisfied based on the value of the amount of remaining kilowatt hours not being within the range of respective values of the other respective remaining amounts of kilowatt hours. In some implementations, the value of the amount of remaining kilowatt hours is determined based on at least one output of a vibration sensor, an oil quality sensor, or a fuel sensor of a monitoring device, of the plurality of monitoring devices, that is configured to monitor an engine, of the plurality of engines, that is associated with the monitoring device and the value of the amount of remaining kilowatt hours.

In some implementations, the plurality of metrics may include respective fuel consumption rates of the plurality of engines. In some implementations, the engine controller, when determining that the switching condition is satisfied, may determine that a value of a fuel consumption rate, of the respective fuel consumption rates, is not within a range of respective values of other fuel consumption rates of the respective fuel consumption rates; and determine that the switching condition is satisfied based on the value of the fuel consumption rate not being within the range of respective values of the other respective fuel consumption rates.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

In some instances, a load may require more than one engine to adequately power the load. For example, an electrical system of a construction site, an electrical system of a marine vessel, a fracturing rig, and/or the like may require sets of engines or sets of generators to provide power. In some instances, prioritization schemes may be set up such that one or more engines may provide more power than another. However, permanent prioritization schemes may cause one or more engines to wear out faster than the others (e.g., those engines that are tasked with providing relatively more power than others according to the prioritization scheme).

According to some implementations described herein, engine controller 120 may adjust a prioritization scheme (e.g., in real-time) based on one or more parameters and/or metrics associated with the plurality of engines. For example, to ensure that the life expectancy of each of the engines is relatively the same, engine controller 120, as described herein, may periodically (or aperiodically) adjust a prioritization scheme to balance the usage of the engines and/or account for detected mechanical issues associated with engines 112.

Accordingly, some implementations described herein may conserve hardware resources and/or power resources. For example, engine controller 120 may reconfigure prioritization schemes to ensure that the life of each of plurality of engines 112 is relatively the same and/or that maintenance schedules are to be relatively the same. As such, replacement costs may be minimized and/or conserved for a set of engines.

Furthermore, costs associated with reconfiguring power to a load can be conserved by ensuring efficient replacement of the plurality of engines (e.g., by using a preconfigured set of engines, rather than replacing engine by engine as the engines reach the end of respective lives). Furthermore, downtime of the plurality of engines, which may result in downtime to a load receiving power from the plurality of engines, can be more predictable as efficient maintenance schedules can be generated and/or configured to enable each of the plurality of engines to be serviced at the same time or within a relatively small time window. Accordingly, such costs associated with maintaining the plurality of engines can be decreased and/or minimized.

As used herein, the articles “a” and “an” are intended to include one or more items and may be used interchangeably with “one or more.” Also, as used herein, the terms “has,” “have,” “having,” or the like are intended to be open-ended terms. Further, the phrase “based on” is intended to mean “based, at least in part, on.”

The foregoing disclosure provides illustration and description but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:

identifying, by a device, a plurality of engines configured to provide power to a load, wherein the plurality of engines have a first set of priorities associated with providing the power to the load;

receiving, by the device, a plurality of parameters from a plurality of monitoring devices monitoring the plurality of engines;

calculating, by the device, a plurality of metrics corresponding to the plurality of engines based on the plurality of parameters;

determining, by the device and based on the plurality of metrics, that a switching condition is satisfied to switch from the first set of priorities to a second set of priorities for the plurality of engines;

determining, by the device and based on determining that the switching condition is satisfied, whether the device is ok to switch; and causing, by the device, the plurality of engines to provide respective amounts of power to the load based on the first set of priorities when the device is not ok to switch and based on the second set of priorities when the device is ok to switch.

2. The method of claim 1, further comprising:
generating a ranking of the plurality of engines according to the plurality of metrics;
determining a total amount of power that is to be provided to the load; and
configuring the second set of priorities according to the ranking and the total amount of power to be provided to the load.

3. The method of claim 1, wherein determining that the switching condition is satisfied comprises:
determining that a value of a metric, of the plurality of metrics, is not within a range of respective values of remaining metrics of the plurality of metrics; and
determining that the switching condition is satisfied based on the value of the metric not being within the range of respective values of the remaining metrics.

4. The method of claim 1, wherein two engines, of the plurality of engines, are mechanically coupled, such that the two engines are to be controlled to have a same engine speed,
wherein determining the second set of priorities for the plurality of engines comprises:
determining the second set of priorities for the plurality of engines further based on the two engines being mechanically coupled.

5. The method of claim 1, wherein a monitoring device, of the plurality of monitoring devices, includes one or more of:
a vibration sensor;
an oil quality sensor;
a speed sensor;
a fuel sensor;
a power output sensor;
a pressure sensor; or
a temperature sensor.

6. The method of claim 1, wherein the plurality of metrics comprise respective amounts of remaining kilowatt hours that respective ones of the plurality of engines are expected to provide until the respective ones of the plurality of engines are expected to experience a failure or need maintenance.

7. The method of claim 1, wherein the plurality of engines comprise a plurality of generators and the power provided to the load comprises electrical power.

8. A device, comprising:
one or more memories; and
one or more processors, communicatively coupled to the one or more memories, to:
identify a plurality of engines configured to provide power to a load,
wherein the plurality of engines have a first set of priorities associated with providing the power to the load;
obtain a plurality of parameters corresponding to the plurality of engines;
determine a plurality of metrics corresponding to the plurality of engines based on the plurality of parameters;
determine, based on the plurality of metrics, that a switching condition is satisfied to switch from the first set of priorities to a second set of priorities for the plurality of engines;
determine, based on determining that the switching condition is satisfied, whether the device is ok to switch; and
cause the plurality of engines to provide respective amounts of power to the load based on the first set of priorities when the device is not ok to switch and based on the second set of priorities when the device is ok to switch.

9. The device of claim 8, wherein the plurality of metrics include respective amounts of remaining kilowatt hours that respective engines of the plurality of engines are expected to provide until the respective engines of the plurality of engines are expected to experience a failure or need maintenance.

10. The device of claim 8, wherein the one or more processors, when determining that the switching condition is satisfied, are to:
determine that a value of a metric, of the plurality of metrics, is not within a threshold difference of an average value of remaining metrics of the plurality of metrics; and
determine that the switching condition is satisfied based on the value of the metric not being within the threshold difference of the average value of the remaining metrics.

11. The device of claim 8, wherein the one or more processors, when determining that the switching condition is satisfied, are to:
determine that an operation associated with the load can be performed in association with the switch from the first set of priorities to the second set of priorities based on the plurality of parameters and a characteristic of the load.

12. The device of claim 8, wherein the plurality of parameters corresponding to the plurality of engines are received from corresponding monitoring devices associated with the plurality of engines.

13. The device of claim 8, wherein the plurality of engines comprise a plurality of generators and the power provided to the load is electrical power.

14. The device of claim 8, wherein the plurality of engines are all a same type of engine.

15. A system comprising:
a plurality of engines;
a plurality of monitoring devices configured to monitor the plurality of engines;
a plurality of engine control modules corresponding to the plurality of engines; and
a controller to:
identify a first set of priorities associated with the plurality of engines providing power to a load;
obtain a plurality of parameters from the plurality of monitoring devices;
determine a plurality of metrics corresponding to the plurality of engines based on the plurality of parameters;
determine, based on the plurality of metrics, that a switching condition is satisfied to switch from the first set of priorities to a second set of priorities associated with providing power to the load;
determine, and based on determining that the switching condition is satisfied, whether the device is ok to switch; and
cause the plurality of engine control modules to control the plurality of engines to provide respective amounts of power to the load based on the first set of priorities when the device is not ok to switch and based on the second set of priorities when the device is ok to switch.

16. The system of claim 15, wherein the controller is to:

generate a ranking of the plurality of engines according to the plurality of metrics;

determine a total amount of power that is to be provided to the load; and configure the second set of priorities according to the ranking and the total amount of power to be provided to the load.

17. The system of claim 15, wherein the plurality of metrics comprise respective remaining amounts of kilowatt hours that are estimated to be provided by the plurality of engines, and the controller, when determining that the switching condition is satisfied, is to:

determine that a value of an amount of remaining kilowatt hours, of the respective remaining amounts of kilowatt hours, is not within a range of respective values of other remaining amounts of kilowatt hours of the respective remaining amounts of kilowatt hours; and determine that the switching condition is satisfied based on the value of the amount of remaining kilowatt hours not being within the range of respective values of the other respective remaining amounts of kilowatt hours.

18. The system of claim 17, wherein the value of the amount of remaining kilowatt hours is determined based on at least one output of a vibration sensor, an oil quality sensor, or a fuel sensor of a monitoring device, of the plurality of monitoring devices, that is configured to monitor an engine, of the plurality of engines, that is associated with the monitoring device and the value of the amount of remaining kilowatt hours.

19. The system of claim 15, wherein the plurality of metrics comprise respective fuel consumption rates of the plurality of engines, and the controller, when determining that the switching condition is satisfied, is to:

determine that a value of a fuel consumption rate, of the respective fuel consumption rates, is not within a range of respective values of other fuel consumption rates of the respective fuel consumption rates; and determine that the switching condition is satisfied based on the value of the fuel consumption rate not being within the range of respective values of the other fuel consumption rates.

20. The system of claim 15, wherein the plurality of engines comprise a plurality of generators and the power provided to the load is electrical power.

* * * * *